United States Patent [19]

Ploss et al.

[11] 4,286,793

[45] Sep. 1, 1981

[54] ICE BREAKING AND MUD DEFLECTING DEVICE FOR A BALL SCREW AND NUT ASSEMBLY

[75] Inventors: Helmut Ploss, Stuttgart; Alfons Remensperger, Nürtingen, both of Fed. Rep. of Germany

[73] Assignee: Warner Electric Brake & Clutch Company, South Beloit, Ill.

[21] Appl. No.: 59,398

[22] Filed: Jul. 20, 1979

[30] Foreign Application Priority Data

Aug. 14, 1978 [DE] Fed. Rep. of Germany ....... 2835551

[51] Int. Cl.³ .................... F16J 15/16; F16H 55/22
[52] U.S. Cl. ................................... 277/165; 277/167; 277/203; 74/424.8 R; 74/459
[58] Field of Search ................ 15/256.5; 277/24, 165, 277/167, 179, 203; 74/424.8 R, 459

[56] References Cited

U.S. PATENT DOCUMENTS

| | | | |
|---|---|---|---|
| 2,076,180 | 4/1937 | Griswold | 74/424.8 R |
| 2,757,548 | 8/1956 | Smith et al. | 74/424.8 R |
| 2,793,538 | 5/1957 | Sears | 74/459 |
| 3,116,931 | 1/1964 | Edwards | 74/459 X |
| 3,646,827 | 3/1972 | Patterson | 277/165 X |
| 3,669,460 | 6/1972 | Wysong | 277/24 |
| 3,678,776 | 7/1972 | Patterson | 74/459 |
| 3,851,541 | 12/1974 | Ploss et al. | 74/459 |
| 4,052,076 | 10/1977 | Wysong | 277/24 |

FOREIGN PATENT DOCUMENTS

| | | | |
|---|---|---|---|
| 693160 | 8/1964 | Canada | 74/424.8 R |
| 693131 | 7/1940 | Fed. Rep. of Germany | 277/203 |
| 559407 | 2/1944 | United Kingdom | 74/459 |

*Primary Examiner*—Robert S. Ward, Jr.
*Attorney, Agent, or Firm*—Leydig, Voit, Osann, Mayer & Holt, Ltd.

[57] ABSTRACT

A ring is telescoped into the end of a nut of a ball screw and nut assembly and carries a lip which breaks ice away from the screw. The plastic insert of relatively short circumferential length is supported by the ring and is urged into the groove of the screw by a spring so as to wipe mud from the screw. A felt strip coacts with the insert to seal the nut against the entry of foreign particles and to restrict the escape of lubricant from the nut.

7 Claims, 5 Drawing Figures

ICE BREAKING AND MUD DEFLECTING DEVICE FOR A BALL SCREW AND NUT ASSEMBLY

BACKGROUND OF THE INVENTION

This invention relates to a ball screw and nut assembly of the type in which a nut is telescoped over a screw and is connected to the latter by a train of recirculating balls. More particularly, the invention relates to a device for breaking ice away from the screw and for wiping and deflecting mud off of the screw in order to prevent the ice and mud from entering the nut and interfering with circulation of the balls.

SUMMARY OF THE INVENTION

The general aim of the present invention is to provide a new and improved ice breaking and mud deflecting device which, when compared with prior devices, applies less friction and less retarding torque to the screw.

A more detailed object is to achieve the foregoing by providing a device in which the mud deflector is formed by two separate sections, the first section being of relatively short circumferential length and performing the primary wiping function so that the second section can be designed to apply low friction to the screw and can be used primarily for sealing purposes.

Still another object is to provide a device which remains effective for a long period of time even after being subjected to lubricants.

The invention also resides in the novel construction which causes ice and mud to advance away from the nut rather than accumulating ahead of the nut and retarding movement thereof.

These and other objects and advantages of the invention will become more apparent from the following detailed description when taken in conjunction with the accompanying drawings.

DETAILED DESCRIPTION OF THE PREFERRED EMBODIMENT

Figure 1:
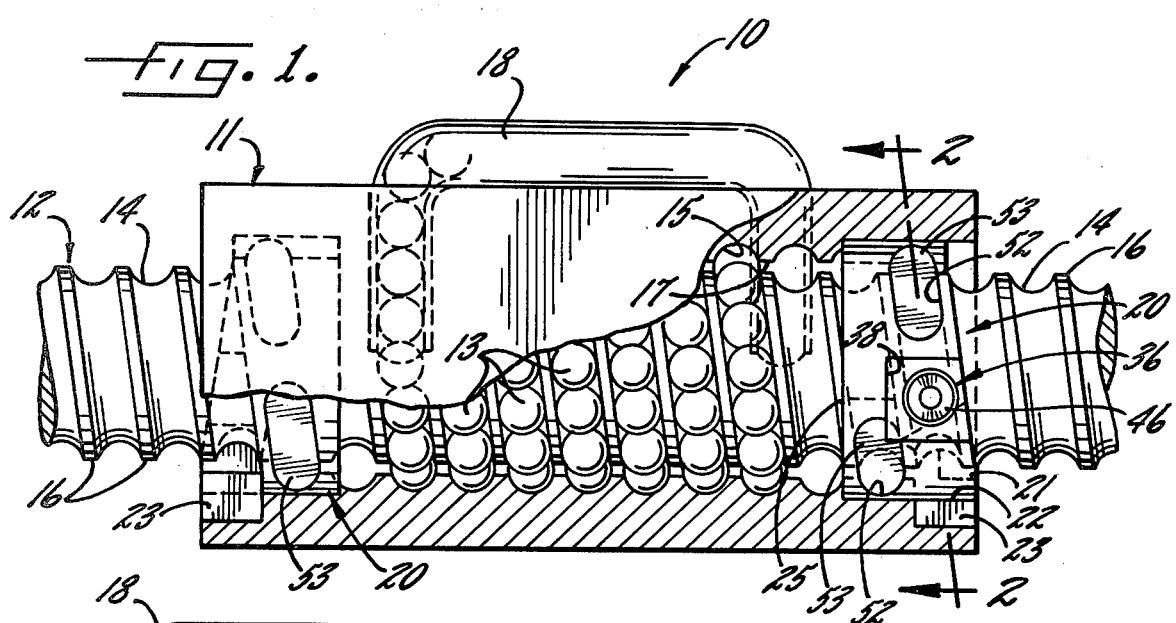
FIG. 1 is a side elevational view of a typical ball screw and nut assembly equipped with a new and improved ice breaking and mud deflecting device incorporating the unique features of the present invention, parts of the assembly being broken away and shown in cross-section.

As shown in the drawings for purposes of illustration, the invention is embodied in a ball screw and nut assembly 10 of the type in which a nut 11 is telescoped over a screw 12 and is connected to the latter by a train of balls 13 which circulate within a race defined by a helical external groove 14 in the screw and a helical internal groove 15 in the nut. The grooves 14 and 15 are generally semicircular in shape and have relatively flat crests 16 and 17, respectively. A return tube 18 is mounted on the outside of the nut and defines a closed return passage for guiding the balls between the ends of the groove 15 in the nut.

The construction and operation of a ball screw and nut assembly are well known and need not be described in detail here. It will suffice to say that the screw 12 usually is rotated while the nut 11 usually is held against rotation so that the nut moves along the screw with the direction of movement being dependent upon the direction of rotation of the screw. As the screw rotates, the balls 13 roll and circulate within the race defined by the grooves 14 and 15 so as to enable the nut to move with low friction.

To maintain the low friction characteristics of the ball screw and nut assembly 10, it is necessary to prevent foreign material which might accumulate on the screw 12 from entering the nut 11 and interfering with proper rolling of the balls 13. When the assembly is used, for example, for actuating the control flap of an aircraft, both ice and mud may collect on the screw. As the nut travels along the screw, the ice must be broken away from the screw and both the ice and the mud (or other foreign material) must be wiped from the screw and prevented from entering the nut.

The present invention contemplates the provision of a new and improved ice breaking and mud deflecting device 20 which effectively removes foreign material from the screw 12 and effectively seals the nut 11 while imposing only relatively low friction on the screw. The device is particularly characterized by the fact that its service life is not detrimentally affected by oil and grease and that it prevents the accumulation of foreign material adjacent the leading end of the nut.

One ice breaking and mud deflecting device 20 is mounted at the right end of the nut 11 to function when the nut is moved from left to right while a second device is mounted at the left end of the nut to function when the nut is moved in the opposite direction. The construction and operation of one device will be apparent from a disclosure of the other and thus only the right hand device has been shown in detail and only that device will be specifically described herein.

Figure 2:
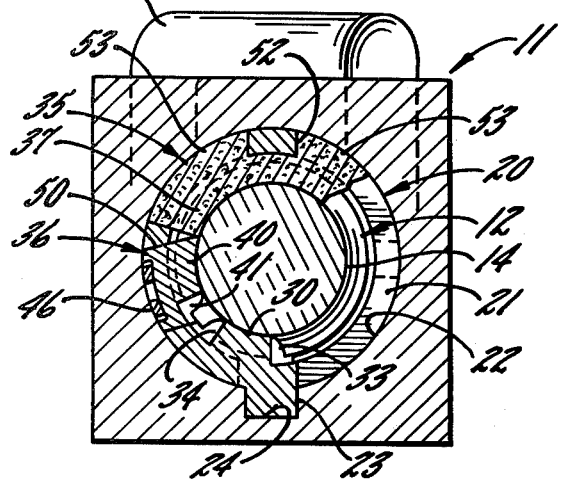
FIG. 2 is a cross-sectional view taken substantially along the line 2—2 of FIG. 1.

As shown in FIGS. 1 and 2, the ice breaking and mud deflecting device 20 includes a ring 21 which is telescoped into and is seated against a counterbore 22 formed in the right hand end portion of the nut 11. The ring preferably is cast from metal and is formed with an integral lug 23. The lug projects radially outwardly from the ring and fits in a slot 24 (FIG. 2) in the nut to prevent the ring from rotating relative to the nut.

The inboard end 25 (FIG. 4) of the ring 21 is defined by a continuous surface which is disposed in a radial plane, that is, the inboard end of the ring is uninterrupted and is perpendicular to the axis of the screw 12. In keeping with the invention, however, the outboard end of the ring 21 is formed by two surfaces 26 and 27 which are located on opposite sides of a step-like transitional surface 28. For a purpose to be described subsequently, the surfaces 26 and 27 define a helix having a lead angle which corresponds to the lead angle of the helical groove 14 of the screw 12.

Figure 3:
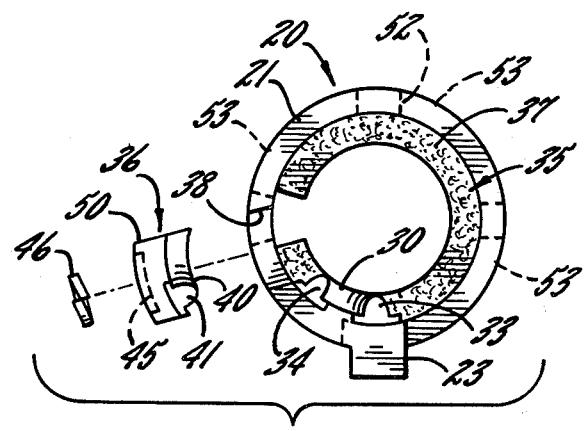
FIG. 3 is an exploded end view of the device.
Figure 4:
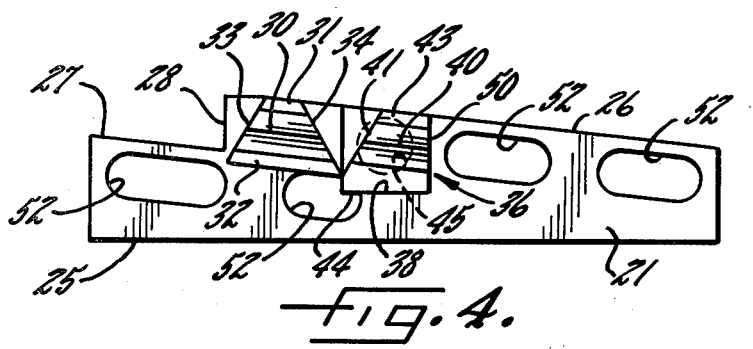
FIG. 4 is a rolled out view of part of the device as viewed in a radial direction.

Formed integrally with the inner surface of the ring 21 is a comparatively short lip 30 (FIGS. 3 and 4) whose contour is complementary with that of the groove 14 in the screw 12, the lip having surfaces 31 and 32 which overlie the crests 16 of the screw with the outboard side of the surface 31 being alined with the surface 26 of the ring. The front end face 33 of the lip is located near the step-like transitional surface 28 and defines an ice breaker for scraping ice from the groove 14 and the crests 16 as the screw 12 rotates. To shift the ice removed from the screw in an axial direction, the front end face 33 of the lip 30 is inclined relative to the axis of the screw as shown in FIG. 4 and is inclined at an angle opening toward the outside and larger than the angle formed between the vertical to the screw helix and the screw axis. The rear end face 34 of the lip 30 is inclined in the opposite direction at an angle of about thirty degrees relative to the axis of the screw.

In carrying out the invention, the device 20 is equipped with a stripper 35 which removes mud from the screw 12 and seals the nut 11 and which is uniquely constructed as two sections 36 and 37 in order to establish low friction against the screw. Herein, the first section 36 of the stripper 35 is formed by an insert which preferably is injection molded from relatively rigid plastic or other low friction, oil-resistant and substantially inelastic material. The insert 36 is received in a notch 38 formed in the outboard side of the ring 21 and comparatively short in a circumferential direction, that is, the insert subtends an angle of only about 45 degrees. The insert is formed with an inwardly projecting rib 40 whose contour is complementary with the groove 14 in the screw 12 and, as shown in FIG. 4, the rib includes a front face 41 which parallels the front face 33 of the lip 30 so as to shift mud axially away from the nut 11. Side surfaces 43 and 44 of the insert 36 overlie the crests 16 of the screw 12 with the outboard side of the surface 43 being alined with the surface 26 of the ring 21.

Formed in the outer side of the insert 36 is a cavity 45 (FIG. 3) which receives a spring washer 46. The latter is loaded between the bottom of the cavity 45 and the circumferentially extending surface of the counterbore 22 and serves to bias the insert 36 inwardly so as to press the rib 40 and the side surfaces 43 and 44 lightly into the groove 14 and against the crests 16, respectively, of the screw 12. The spring pressure is sufficiently high to cause the insert 36 to strip mud from the screw but is not so high as to create a large frictional force between the insert and the screw.

The second section 37 of the stripper 35 is formed by a flexible strip made of a fibrous material (e.g., felt) which will not swell or expand when subjected to oil and grease. As shown in FIGS. 2 and 3, the felt strip 37 is formed into a ring and is fitted into the groove 14 of the screw 12. One end of the strip 37 abuts the rear face 50 of the insert 36, and the strip is sufficiently long so as to circumferentially overlap the front face 41 of the insert so that the strip and the insert together subtend an angle of more than 360 degrees in order to completely close the outboard end of the nut 11.

Figure 5:
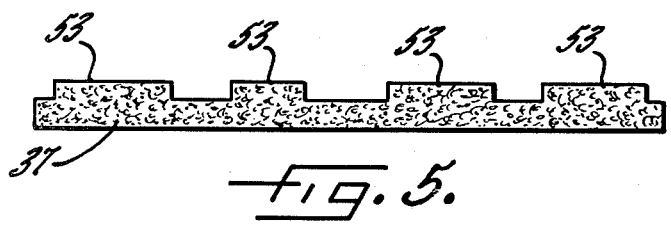
FIG. 5 is a rolled out view of another part of the device as viewed in an axial direction.

To secure the strip 37 to the ring 21, oblong holes 52 (FIG. 4) are formed through the ring and are arranged with their centerlines located on a helix which corresponds with the lead angle of the groove 14 in the screw 12. Radially projecting lugs 53 (FIG. 5) are formed integrally with the outer side of the strip 37 and are adapted to be received in the holes 52 with a press fit. When the lugs 53 are pressed into the holes 52, the strip 37 is formed into a helix and fits into the groove 14 in the screw 12 so as to seal the outboard end of the nut 11. By virtue of fitting into the groove 14, the strip 37 holds the ring 21 in a fixed axial location relative to the nut 11. Thus, the lip 30 and the rib 40 need not perform a positioning function and hence can be designed to achieve an optimum deflecting and stripping function.

With the foregoing arrangement, any ice which accumulates on the screw 12 is broken away by the lip 30 and is pushed outwardly from the nut 11 by the front face 33 of the lip and by the helix defined by the surfaces 26 and 27 of the ring 21. The insert 36 wipes mud and any remaining foreign particles from the groove 14 of the screw and such particles are pushed away from the nut by the front face 41 of the insert and by the surfaces 26 and 27. Thus, ice and mud are prevented from accumulating at the leading end of the nut and exerting a retarding force on the nut.

Since the insert 36 effectively strips mud from the screw 12, the felt strip 37 is not required to perform any wiping function but instead simply coacts with the insert to seal the outboard end of the nut 11 against the inward entry of foreign particles and against the outward escape of lubricants. Thus, there is relatively low friction between the strip and the screw and, with the strip being made of felt, there is no danger of the strip swelling and increasing the friction after the strip becomes exposed to lubricants. Because the insert 36 is made of low friction plastic and is relatively short in a circumferential direction, the frictional retarding force applied by the insert is relatively low even though the insert is effectively pressed against the screw by the spring 46.

We claim:

1. An ice breaking and mud deflecting device for a ball screw and nut assembly having a nut and a screw each formed with a helical ball groove, said device comprising a ring adapted to fit non-rotatably into one end portion of said nut, a stripper extending helically around the inside of said ring at a lead angle corresponding to the lead angle of the ball groove of said screw, said device being characterized in that said stripper is formed by a flexible strip secured to said ring and positioned to fit within the ball groove of said screw, said strip having one end located adjacent the outboard edge of said ring, said stripper further comprising an insert formed separately from said strip and made of substantially inelastic material, said insert being located adjacent said one end of said strip and extending over a considerably shorter circumferential angle than said strip, and resiliently yieldable means acting on said insert and urging the latter radially inwardly into the ball groove of said screw.

2. An ice breaking and mud deflecting device as defined in claim 1 in which said strip is made from fibrous material.

3. An ice breaking and mud deflecting device as defined in claims 1 or 2 in which said insert is made from oil-resistant plastic.

4. An ice breaking and mud deflecting device as defined in claim 1 in which said ring is formed with an opening for receiving said insert, said resiliently yieldable means comprising a spring loaded between the outside of said insert and the inside of said nut.

5. An ice breaking and mud deflecting device as defined in claim 4 in which a cavity is formed in the outside of said insert for receiving said spring.

6. An ice breaking and mud deflecting device as defined in claim 4 in which the outboard edge of said ring defines a helix having a lead angle corresponding to the lead angle of the ball groove in said screw, said insert having an outboard edge which is alined with the outboard edge of said ring.

7. An ice breaking and mud deflecting device as defined in claims 1 or 2 in which holes are formed in said ring and are spaced from one another along a helix having a lead angle corresponding to the lead angle of the ball groove of said screw, and lugs formed integrally with and projecting outwardly from said strip and extending into said holes to secure said strip to said ring.

* * * * *